July 12, 1949. C. L. MONSON 2,475,798
MOTION-PICTURE FILM ILLUMINATOR AND MAGNIFYING VIEWER
Filed Jan. 11, 1947
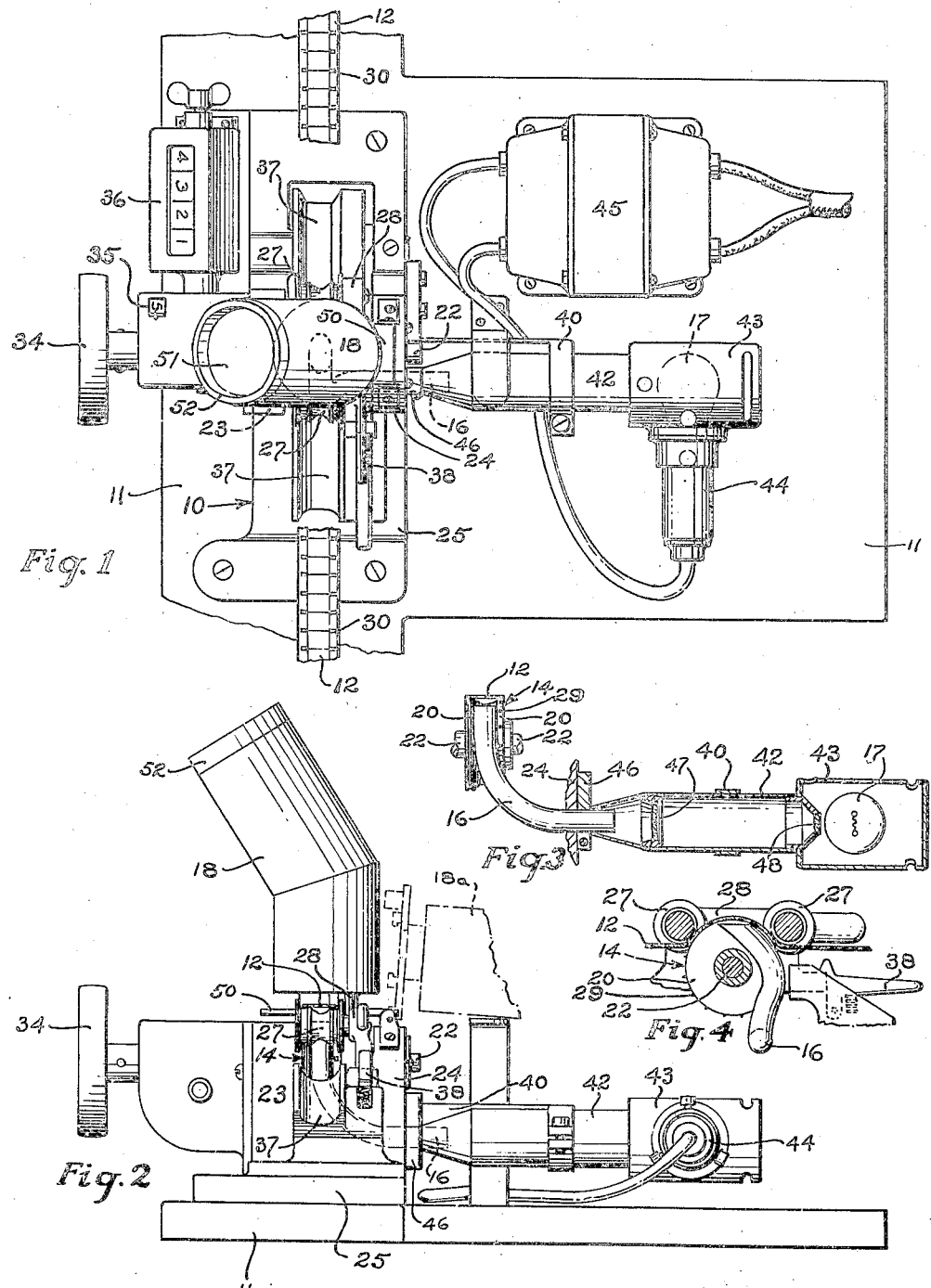
INVENTOR;
CHARLES L. MONSON.
BY Romeyn A. Spare
HIS ATTORNEY.

Patented July 12, 1949

2,475,798

UNITED STATES PATENT OFFICE 2,475,798

MOTION-PICTURE FILM ILLUMINATOR AND MAGNIFYING VIEWER

Charles L. Monson, Bristol, Conn., assignor to General Motors Corporation, Detroit, Mich., a corporation of Delaware Application January 11, 1947, Serial No. 721,544

3 Claims. (Cl. 88—1)

This invention relates to viewing and editing devices for motion picture films and particularly to a viewer illuminating system which will not subject the film to heat.

Heretofore, in motion picture film viewing apparatus as used for editing, an operator observed the successive film images through an optical system including a shutter while the film was rapidly and continuously fed across an opening containing a brilliant light source. This light source, which commonly constitutes a concentrated filament lamp closely adjacent to the film, usually emits so much heat that the film traverse may only be stopped momentarily before that portion of film adjacent to the lamp is spoiled.

In the time study and analysis of various manufacturing operations, it is frequently helpful to record these operations on motion picture film for later projection and detailed study. However, the previously available film viewing apparatuses prevent detailed study of individual exposures or frames from a motion picture film in view of the damaging heat reaching the film from the illuminating system.

An object of this invention is to provide an improved motion picture film viewing apparatus wherein the film will not be detrimentally heated by the illuminating system. Another object is to provide an improved film viewing apparatus for facilitating the study of single exposures on the film. A further object is to provide for a motion picture film an improved illuminating system which will not direct heat against the film.

To these ends and also to improve generally upon devices of this character, my invention consists in the various matters hereinafter described and claimed. In its broader aspects, the invention is not necessarily limited to the specific structures selected for illustrative purposes in the accompanying drawings wherein Figure 1 is a plan view of my motion picture film viewing apparatus;

Figure 2 is a side elevation of the viewing apparatus;

Figure 3 is a fragmentary side elevation of the illuminating system; and

Figure 4 is a fragmentary front elevation showing the relation of the light conducting member to the film.

Generally considered, a motion picture film measuring and frame counting apparatus 10, secured to a base 11, is arranged to feed a motion picture film 12 over a sprocket 14, and a light transmitting member 16, which obstructs the passage of heat, directs light against the underside of the film 12 from a remotely located lamp 17. The sprocket 14 is rotated to locate the desired film frame over the light conducting member 16, and an operator may study an enlarged image of the film through an optical system mounted in a housing 18 above the film.

In the illustrated embodiment, the sprocket 14 has spaced film supporting flanges 20 connected to a hub that is secured to a horizontal shaft 22 journalled in spaced upstanding arms 23 and 24 of a main frame 25 fastened to the base 11. A pair of spaced guiding rolls 27, rotatably supported by a carriage 28 pivoted to the main frame, locate the film 12 against the upper portion of the sprocket 14 which has one of its flanges provided with spaced teeth 29 engageable with the usual film perforations 30 for locating and feeding the film. Positioning and feeding of the film is accomplished by turning a hand wheel 34, secured to the shaft 22, and gears connected to the shaft 22 operate a frame counter 35 and a film footage counter 36. Film receiving channels 37 in the main frame guide the film as it approaches and leaves the sprocket 14. A carriage-locking latch 38 may be released and the carriage may be swung upwardly to lift the guide rolls 27 away from the sprocket 14 whenever the film is to be fitted over or removed from the sprocket.

A bracket 40, secured to the main frame 25, adjustably holds a lens tube 42 at whose rearward end is mounted a lamp house 43 containing the lamp 17 mounted in a socket 44 and receiving current from a suitable source, as a transformer 45 connected to a power line. The tapered forward end of the lens tube fits over the horizontally projecting lower end of the light conducting member 16 which extends through a bore in the arm 24 and upwardly between the sprocket flanges 20, the upper end of this member 16 being finished off to provide a substantially flat surface adjacent to and directly beneath the film at the top of the sprocket 14. The lower end of the light conducting member 16 may be adjustably clamped in position by a bracket 46 secured to the arm 24. Coaxial lenses 47 and 48 in the lens tube 42 concentrate and focus the light rays from the lamp 17 on the lower end face of the light conducting member 16 which is finished off to provide a substantially flat surface generally perpendicular to that of the lens axes. The tube 42 is adjusted in the bracket 40 to focus the concentrated light rays on the lower end face of the member 16. This light conducting member, which directs a substantially cold light onto the film, may comprise a rod of thermoplastic methyl methacrylate resin commonly known as "Lucite," or it may comprise a rod of quartz glass or other material having similar characteristics of low heat conductivity and high light conductivity throughout its length irrespective of the shape to which the rod is bent.

The housing 18 is secured to a plate 50 pivotably supported at its rearward end by a bracket fastened to the top of the arm 24. The plate 50 has a rectangular through aperture of a size corresponding to that of a single film frame, and the housing 18 contains a lens system through which an operator may study an enlarged film image of the desired frame located beneath the aperture in the plate 50. To aid in focussing, the top element 51 of the lens system is mounted in a sleeve 52 that may frictionally slide in the upper end of the housing 18. During positioning and removal of the film on the sprocket 14, the housing 18 may be tilted backwardly out of the way to the generally horizontal position 18a shown in dot and dash lines in Figure 2.

I claim:

1. In a film viewer for viewing selected frames of a motion picture film, a sprocket for supporting and feeding a motion picture film, spaced flanges on said sprocket, a viewing lens positioned above the sprocket, a lamp remote from the sprocket, a longitudinally curved transparent light conducting rod having one end extending upwardly between the flanges and having its other end extending laterally into spaced relation with said lamp, and means for adjustably focussing the light from said lamp onto said other end of the light conducting rod.

2. In a film viewer for viewing selected frames of a motion picture film, a sprocket having spaced flanges for supporting and feeding a motion picture film, a lens above the sprocket, a lamp remote from the sprocket, a transparent light conducting rod having one end extending upwardly between the flanges, a flat surface on said rod end beneath the lens, a lamp housing, said rod being longitudinally curved and having its other end laterally extending into the housing, a flat end face on the laterally extending portion of the rod, and adjustable means for concentrating the light rays from the lamp onto said flat end face.

3. In a film viewer for viewing selected frames of a motion picture film, a rotatable member having spaced film supporting flanges, a viewing lens above said member, means to rotate said rotatable member for selectively positioning frames of said film beneath the lens, a lamp remote from said rotatable member, a longitudinally curved light conducting rod extending upwardly between said film supporting flanges and terminating in a flat end face beneath said lens and in closely spaced relation to that portion of the film beneath said lens, and means for focussing and concentrating the light from said lamp onto the other end of said light conducting rod.

CHARLES L. MONSON.

REFERENCES CITED

The following references are of record in the file of this patent:

UNITED STATES PATENTS

| Number | Name | Date |
|---|---|---|
| 1,803,411 | Stechbart | May 5, 1931 |
| 1,815,486 | Serrurier | July 21, 1931 |
| 1,880,414 | Capstaff | Oct. 4, 1932 |
| 1,931,552 | Maris | Oct. 24, 1933 |
| 2,410,104 | Rainey | Oct. 29, 1946 |